ation is caused.

2,905,594

MEANS FOR DETECTING ENZYME ACTIVITY

Herman J. Morris, Berkeley, Calif., assignor to the United States of America as represented by the Secretary of Agriculture No Drawing. Application April 25, 1956
Serial No. 580,675

14 Claims. (Cl. 195—103.5)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to a novel analytical implement and to methods for producing and utilizing it. More particularly, the invention concerns an analytical implement in strip form which exhibits a vivid color change when contacted with tissue containing active enzymes. The implement is particularly useful for testing for adequacy of blanching in the processing of vegetative materials. Further objects and advantages of the invention will be obvious from the description herein.

In the preservation of vegetables and fruits by freezing, dehydrating, etc., it is usually necessary as a preliminary step to inactivate the enzymes in the vegetative tissue to prevent darkening or other undesirable changes. This blanching operation is commonly effectuated by contacting the produce with steam or hot water. In most cases it is preferred to cut short the blanching treatment at the point when the enzymes are inactivated. In this way the natural taste and texture are not drastically altered as would be the case were the blanching treatment prolonged to the point of complete cooking of the tissue.

It is known that the progress of blanching operations can be followed by testing the material under treatment for the presence of active enzymes. Methods are known in the industry which involve testing the material for the presence of such enzymes as catalase and peroxidase. Generally, carrying out of the known test methods requires a certain degree of skill in that the operator must be able to measure out definite quantities of reagents. Also since the reagents are employed in solution form they are not stable and must be replaced at short intervals to get reliable results.

It has now been found that the progress of a blanching operation can be followed in a very simple yet accurate way. This is done with the aid of an analytical implement comprising, in the preferred modification of the invention, a strip of paper impregnated with urea peroxide and ortho-tolidine. This implement is very sensitive to the presence of the enzyme peroxidase. When this enzyme in the presence of moisture is contacted with the analytical strip, a vivid dark blue color is formed in the paper at the area of contact. In a typical situation, as for example, where potato dice are undergoing blanching, the operator need but remove a sample of the dice at intervals and press them against the analytical strip. The blue coloration will be formed as long as active peroxidase is present in the tissue. When a point is reached at which substantially no color is produced, the operator is assured that the blanching is complete and the potatoes may be removed from the blancher and processed further.

The analytical implement in accordance with the invention has many advantages. In the first place it can be used by an unskilled operator since no measurement of reagents is required. All the operator has to do is to press the specimen of tissue against the test paper and observe whether or not a color change is produced. In the alternative, if the tissue is relatively dry on the surface he can squeeze the specimen to allow the exuded juice to contact the test paper. The analytical implement, or test paper as it may be called, is very sensitive and will clearly indicate by vivid coloration the presence of very minute amounts of enzymes. Another point is that the strip is relatively stable in contrast to solutions of hydrogen peroxide and other reagent solutions used in the known methods. Also, the strip can easily be prepared with reproducible sensitivity by simply impregnating it with the same amounts of the active reagents.

The color development of the analytical implement is caused by oxidation of the amine component, this oxidation being catalyzed by the presence of peroxidase. Since the enzyme, peroxidase, is present in virtually all forms of plant life, the analytical implement can be used in connection with the processing of any type of fruit or vegetable, examples being potatoes, tomatoes, peas, beans, carrots, cauliflower, broccoli, spinach, apples, pears, peaches, apricots, cherries, orange juice, grape juice pureed fruits and vegetables and so forth.

The preparation of the test paper in accordance with this invention involves simply impregnating uncoated, absorbent paper with a solution containing (1) urea peroxide and (2) an aromatic polyamine or other compound which is capable of forming a colored oxidation product in the presence of a peroxide and peroxidase. The solvent for application of these reagents is not critical. Usually ethanol is used but other inert volatile solvents can be employed, such as methanol, propanol, isopropanol, any of the isomeric butanols, etc. The concentration of the reagents in the solution is not critical and may be varied widely. Usually, for practical purposes a concentration of about 0.1 to 2% of each of the reagents in the solution is used. After the paper is impregnated with the solution, it is subjected to drying to evaporate the solvent. This may be done by allowing the impregnated paper to stand in air, in a vacuum, or it may be subjected to current of warm air at, say, about 50–100° C.

Although the backing for the analytical implement is preferably paper of an absorbent and chemically pure grade such as filter paper, other porous materials may be used, for example, cloth, porous ceramics, asbestos fiber, glass fiber, textiles, and so forth.

The reagent which develops a color on oxidation is preferably orthotolidine. However, one can use any other organic compound which is essentially colorless and which forms a colored oxidation product in the presence of a peroxide and peroxidase. Illustrative examples of such compounds are listed below:

Benzidine
Ortho methyl benzidine
Meta tolidine
3,3'-diethyl-4,4'-diaminodiphenyl
Ortho dianisidine
Ortho phenylene diamine
Meta phenylene diamine
Para phenylene diamine
2,3-toluylene diamine
2,4-toluylene diamine
2,5-toluylene diamine
2,6-toluylene diamine
3,4-toluylene diamine
3,5-toluylene diamine
1,2,3,-triamino benzene
1,2,4-triamino benzene
2,4,6-triamino benzene
4,4'-diaminodiphenyl methane
Pyrogallic acid
Guaiacol
Catechol
Hydroquinone
Toluhydroquinone
Pyrogallol
Phloroglucinol
Thymol
Resorcinol
Orcinol
Gallic acid
Pyrocatechic acid
Leuco malachite green, etc.

Where the color-developing reagent is an amine, it is generally employed in its free base form but may also be employed in salt form, for example, as a salt with hydrochloric acid, sulphuric acid, acetic acid, citric acid or other acid which does not exert an oxidizng effect on the amine.

The test paper impregnated with urea peroxide and the color developing reagent is preferably stored under dark, cool and dry conditions to preserve its sensitivity for long periods of time. It is obvious that for calibration purposes the paper may be standardized to produce a measured color when contacted with a definite amount of a peroxidase solution of known concentration. Thus the concentration of urea peroxide and color-developing reagent may be regulated to provide a test paper which will give the same color change when exposed to the same amount of enzyme in a fruit or vegetable product.

In some cases, it is preferable to add urea to the solution containing the urea peroxide and the color-developing reagent. The urea has the effect of stabilizing the urea peroxide during storage of the test paper. The amount of urea may be, for example, from one-tenth the weight of the urea peroxide up to an equal weight of the urea peroxide.

Although the product of this invention is primarily useful for determining the adequacy of blanching of fruit and vegetable materials, its use is not necessarily so restricted, and it can be utilized in any application where it is necessary to determine whether a material contains active enzymes. Thus the processing of the material may involve application of heat, enzyme-inactivating chemicals, preservative agents, radiant energy, high frequency electromagnetic waves, ultra sonic vibrations, irradiation by means of X-rays, alpha rays, beta rays, gamma rays or other emissions from radioactive sources. In any of such cases the device can be utilized to determine the effect of the process on the destruction of enzymes. Another application of the invention involves deliberate addition of peroxidase to the material under process, in such case the destruction of the enzyme as measured with the test paper of this invention may be utilized or an index of other characteristics of the material under process, for example, the degree of pasteurization, the degree of cooking, the degree of development of flavor and so forth. Other applications involving the use of an enzyme as a tool to follow the course of a process will be obvious to those skilled in the art.

The invention is further demonstrated by the following examples.

*Example I*

A solution was prepared containing 0.1% urea peroxide and 1% orthotolidine dissolved in 95% alcohol. Pieces of chemical filter paper (Whatman's #50) were soaked in the solution then removed, dried in air and finally dried in a vacuum desiccator. The dry test paper was white in color.

The test paper prepared as above described was contacted with pieces of fresh produce such as potato, peas, apple, peach, etc. In each case a vivid blue color developed almost instantly in the area of contact. When the test paper was contacted with completely blanched produce no color was produced.

*Example II*

A lot of shelled fresh peas were subjected to blanching with steam. During the treatment, samples of the peas were removed at intervals and tested for enzyme activity. In one test, the peas were assayed for residual peroxidase activity by a standard chemical method involving measuring the rate of coloration of guaiacol by means of a colorimeter. In the second test, the peas were pressed against pieces of the test paper prepared as described in Example I, noting the time for development of the blue coloration. The results obtained are tabulated below:

| Blanching time, seconds | Residual peroxidase, percent | Time for appearance of color in test paper, seconds |
| --- | --- | --- |
| 20 | 92 | 5. |
| 35 | 72 | 8. |
| 50 | 42 | 10. |
| 70 | 17 | 75. |
| 90 | 7 | 120 (slight coloration). |
| 180 | 0 | No coloration in 3 minutes. |

*Example III*

A solution was prepared containing 0.5% urea peroxide and 0.5% benzidine dissolved in 95% alcohol. Pieces of chemical filter paper were soaked in this solution then dried in air. The dry test paper was white in color.

The test paper prepared as above described was contacted with pieces of fresh produce such as potato, peas, apple, peach, etc. In each case a vivid dark blue color developed almost instantly in the area of contact. When the test paper was contacted with completely blanched produce no color change was produced.

*Example IV*

A solution was prepared containing 0.5% urea peroxide and 0.5% para phenylenediamine dissolved in 95% alcohol. Pieces of chemical filter paper were soaked in this solution then dried in air. The dry test paper was white in color.

The test paper prepared as described above was contacted with pieces of fresh produce such as potato, peas, apple, peach, etc. In each case a vivid purple to black color developed almost instantly in the area of contact. When the test paper was contacted with completely blanched produce, no color change developed.

*Example V*

A solution was prepared containing 0.5% urea peroxide and 0.5% pyrogallic acid dissolved in 95% alcohol. Pieces of chemical filter paper were soaked in this solution then dried in air. The dry test paper was white in color.

The test paper prepared as above described was contacted with pieces of fresh produce such as potato, peas, apple, peach, etc. In each case a vivid yellow color developed almost instantly in the area of contact. When the test paper was contacted with completely blanched produce, no color change developed.

Having thus described the invention, I claim:

1. An analytical implement consisting of porous sheet material impregnated solely with the following ingredients: (1) urea peroxide and (2) an organic compound which forms a colored oxidation product in the presence of peroxide and peroxidase.

2. The analytical implement of claim 1 wherein the said organic compound is an aromatic polyamine.

3. The analytical implement of claim 1 wherein the said organic compound is ortho-tolidine.

4. The analytical implement of claim 1 wherein the said organic compound is benzidine.

5. The analytical implement of claim 1 wherein the said organic compound is para-phenylenediamine.

6. The analytical implement of claim 1 wherein the said organic compound is pyrogallic acid.

7. An analytical implement consisting of porous sheet material impregnated solely with the following ingredients: (1) urea peroxide, (2) an organic compound which forms a colored oxidation product in the presence of peroxide and peroxidase, and (3) urea.

8. A method for preparing an analytical implement which comprises impregnating porous sheet material with a solution containing solely the following ingredients:

(1) a volatile solvent, (2) urea peroxide, and (3) an organic compound which forms a colored oxidation product in the presence of a peroxide and peroxidase, and evaporating the solvent from the impregnated porous sheet material.

9. The method of claim 1 wherein the said organic compound is ortho-tolidine.

10. The method of claim 1 wherein the said organic compound is benzidine.

11. The method of claim 1 wherein the said organic compound is para-phenylenediamine.

12. The method of claim 1 wherein the said organic compound is pyrogallic acid.

13. A method for preparing an analytical implement which comprises impregnating porous sheet material with a solution containing solely the following ingredients: (1) a volatile solvent, (2) urea peroxide, (3) an organic compound which forms a colored oxidation product in the presence of peroxide and peroxidase, and (4) and urea, and evaporating the solvent from the impregnated porous sheet material.

14. A method for testing vegetative material for the presence of active enzymes which comprises contacting the vegetative material with an analytical implement consisting of porous sheet material impregnated solely with the following ingredients: (1) urea peroxide and (2) an organic compound which forms a colored oxidation product in the presence of a peroxide and peroxidase.

References Cited in the file of this patent

UNITED STATES PATENTS

| | | |
|---|---|---|
| 2,290,436 | Kamlet | July 21, 1942 |
| 2,359,052 | Scharer | Sept. 26, 1944 |
| 2,671,028 | Clark | Mar. 2, 1954 |
| 2,799,660 | Nicholls et al. | July 16, 1957 |

OTHER REFERENCES

"Chemistry and Methods of Enzymes" (Sumner et al.), Academic Press Inc. (New York, N.Y.), 1953, page 221 relied on.

Journal of Biological Chemistry, vol. 201, 1953, pages 413–426.